United States Patent [19]

Frederick

[11] 4,373,611
[45] Feb. 15, 1983

[54] CONVEYOR TO INTERFIT WITH A LOADED SHOPPING CART AND TO MOVE PORTIONS OF THE LOAD, ON DEMAND OF A CHECKER, TO THE FRONT OF THE CART, FOR REMOVAL, PRICE SCANNING, AND BAGGING, BY THE CHECKER AT A CHECKOUT STAND

[76] Inventor: Roderick J. Frederick, 1205 6th Ave. S., Seattle, Wash. 98134

[21] Appl. No.: 192,931

[22] Filed: Oct. 1, 1980

[51] Int. Cl.³ .......................................... A47B 46/00
[52] U.S. Cl. ................................. 186/64; 414/390
[58] Field of Search ................... 186/62–65, 186/59–61, 66–69; 280/DIG. 4; 414/390; 198/817

[56] References Cited

U.S. PATENT DOCUMENTS

| | | | |
|---|---|---|---|
| 2,676,026 | 4/1954 | Goldman | 186/62 |
| 3,052,319 | 9/1962 | Swanson | 186/63 |
| 3,369,631 | 2/1968 | Shoffner | 186/65 |
| 3,454,139 | 7/1969 | Lachance et al. | 186/64 |
| 3,792,757 | 2/1974 | Musser | 186/64 |

OTHER PUBLICATIONS

*Computer-Assisted Checkout*, Fred Meyer, 6 pages.

Primary Examiner—Stanley H. Tollberg
Attorney, Agent, or Firm—Roy E. Mattern, Jr.

[57] ABSTRACT

In grocery stores, other markets, and warehouses a customer's loaded shopping cart is directed by the customer into an inter-related sloping position with a conveyor. Upon demand, the checker runs the conveyor to move portions of the load to the just opened front of the shopping cart. The checker then easily reaches the respective items being purchased, moving them across a scanner and into bags, or beyond for bagging.

47 Claims, 22 Drawing Figures

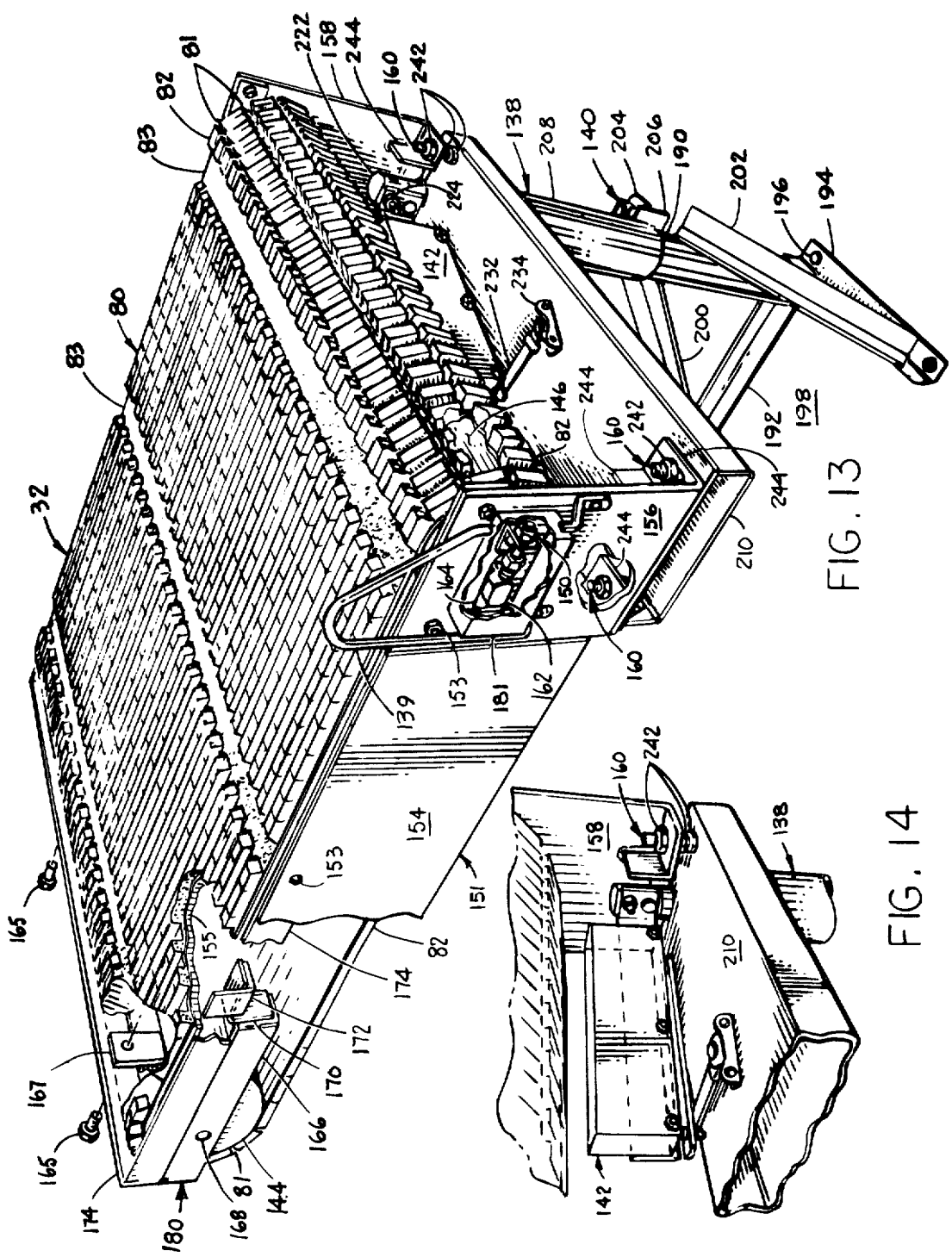

CONVEYOR TO INTERFIT WITH A LOADED SHOPPING CART AND TO MOVE PORTIONS OF THE LOAD, ON DEMAND OF A CHECKER, TO THE FRONT OF THE CART, FOR REMOVAL, PRICE SCANNING, AND BAGGING, BY THE CHECKER AT A CHECKOUT STAND

In a preferred embodiment, the conveyor slopes slightly downwardly to its entry, and the bottom of the shopping cart slopes slightly upwardly to its front, the angle of slope for both of them being the same. Also the length of the conveyor and the length of the bottom of the cart are essentially the same, so all items purchased will be moved to the front of the cart. The conveyor has a belt which is continuously wrapped about cylindrical rollers at each end of its travel, and, throughout its width, the belt is continuous with alternate, parallel ribs and spaces to interfit with longitudinal members of the basket of the cart. At least at one crosswise location the ribs are formed with partial round recesses to receive and move forward round items in the cart to be conveyed to the front of the basket. An electric motor drive, either internal or external of one of the cylindrical rollers, powers the conveyor, when a checker moves a knee and/or front switch. The conveyor is cleared of a withdrawing cart by rotating its entry end, further into the checkout stand, the clearing occurring when less than one-half the length of the conveyor is uncovered by the oppositely swinging and departing empty cart. The conveyor automatically returns for the next approaching loaded cart, with its spaced roller guides aligned to receive the roller end of the carts centerline alignment member.

The checkout stand has a scanner located at the exit of the conveyor, so items removed from the cart are immediately passed over the scanner. When the checker is working, without an assistant, he or she utilizes a bagging shelf located just beyond the scanner. When an assistant is available, a countertop portion is pivoted upwardly into place, so the checker moves the items, just scanned, directly on to the assistant utilizing an end bagging shelf.

The shopping cart, when being loaded, has its front covered by a locked in place pivotal gate. Once the shopping cart is ready for unloading, the checker unlocks this front gate and pivots it upwardly to gain access to the items at the front of the cart. Once these front items are removed, the conveyor is operated to bring other items to the front of the cart for their convenient handling by the checker. After a series of conveyor movements the cart will be unloaded of all items. The rear of the cart has a sloping back to insure all items will slide forwardly and downwardly to the conveyor. This sloping back is pivotally moved over center, when necessary, to serve as a back rest, when a baby is seated on the cart. The cart basket portion is pivoted upwardly and locked for nesting with other like carts, as other tapered portions of all the carts, interfit to complete the nesting of a group of carts.

BACKGROUND OF THE INVENTION

For the many years, supermarket shopping has been available, there have been continuing efforts to speed up the customers' checking out process. In so doing, there have been continuing efforts to reduce the overall costs of such speed up processes and related equipment, and also to reduce the physical effort and time consumed by both the customer and the checker. With the availability of the code scanners, in turn quickly establishing the current prices and totalling the same, there are needs for processes and apparatus to gain greater benefits from the utilization of the scanners. How such scanners are used is described in a publication of the Fred Meyer stores of Washington and Oregon entitled, "The Computer Assisted Check Out."

Some of the developments of the past which have been directed to these objectives, before the arrival of the scanner, and which certainly would work well with scanners, are the patents which concern grocery carts, which each individually have their own conveyors, and which unload oftentimes on additional conveyors located at the checkout locales. In 1964, in U.S. Pat. No. 3,145,856 Messrs. Lachance and Ciborowski illustrated and described their grocery cart with its own self contained conveyor for unloading the cart as the conveyor was in effect the bottom of the cart. An adjacent conveyor was available at the checkout locale. In 1966, in U.S. Pat. No. 3,270,837, Mr. Armand A. Lachance, illustrated and described his automatic grocery cart which had conveyor unit, without his own drive, as the bottom of a cart. At the checkout locale an adjacent conveyor when powerred to receive the customers' items leaving the cart, also with an extending drive unit, powered the conveyor of this automatic grocery cart. In 1969, Garth Close, in his U.S. Pat. No. 3,446,315, disclosed his grocery cart with a front opening gate and a conveyor bottom, which was driven, upon contacting the moving conveyor positioned at the checkout locale, to thereby unload the items from the cart conveyor on to checkout conveyor. In 1969, Messrs Lachance and Howard, in their U.S. Pat. No. 3,454,139, described and illustrated their automatic grocery cart, which had a conveyor bottom. Upon its abutment to a conveyor at a checkout locale the checkout conveyor powered the cart bottom conveyor to unload the items from the cart. In 1972, in U.S. Pat. No. 3,700,074, Mr. Shoffner, shows and tells about his adjustable carts, not having their own conveyor components, but being adjustable to be unloaded on different height conveyors located at checkouts locales. He also disclosed how purchased items could be removed from one cart, tallied, and then placed into an adjacent cart thereby eliminating most of the counter areas provided by many checkout stands. In 1972 in U.S. Pat. No. 3,678,660, and in 1974 in U.S. Pat. No. 3,792,757, Malcolm E. Musser illustrated and described his basket cart unloading apparatus, wherein in reference to about seventy percent of the bottom of his grocery cart, bottom cantilevered longitudinals, were guided between spaced belts and pulleys of an unloading conveyor located at a checkout stand, to unload most items from the grocery cart, with some items at the back thirty percent, often requiring the long reach of the checker. Following the unloading of the cart, its direct reversing for seventy percent of its bottom length was required to clear the conveyor belts and pulleys. Subsequently, the cart was not nestable with other like carts. There are nestable carts in use wherein the basket and other support components are tapered in a horizontal plane for nesting engagement as one cart is pushed with its front initially bearing against the rear of the cart ahead, and then the carts are overlapped. Moreover, as shown and explained by Sylvan N. Goldman in U.S. Pat. No. 2,676,026, the baskets of carts and also portions of the support components may first be pivoted vertically and then all the tilted components are designed to nest, when the carts are overlapped for temporary storage. Although the unloading of carts by using conveyors is well presented in these prior patents, there remained needs, as yet unfilled, to increase the overall efficiency of all the checkout functions, reduce costs, lessen human effort, and enhance the overall capabilities of the scanners.

SUMMARY OF THE INVENTION

In a supermarket, a checker-unload overall assembly includes a new conveyor, a new cart, and a new checkout stand. During operation, a customer after shopping in the usual manner directs her or his loaded cart into a guided complete interfit with a pedestal and pivotal mounted conveyor. Then the checker completes the lifting and securing of the front gate of the basket of the cart, previously locked down in place until final interfitting with the conveyor. After removing the immediately available items, the checker via a demand knee or foot operated control, selectively advances the conveyor to being more items and eventually all items within his or her easy, no stoop, reach, for an immediate pass over an adjacent scanner and into a bag, or bagging beyond, if an assistant is available.

The checker works adjacent a thirty six inch high scanner, counter top location, and conveyor exit. Other components such as the keyboard, scale and bag dispenser are all within his or her easy, no-stoop, reach. Double personnel operations are likewise easily undertaken, as a bag well top is raised, so items are conveniently passed to a follow on bagging locale.

Guiding partitions partially surrounding the conveyor and checkout stand, control the spacing of follow on customers and their carts, and guide all customers and their carts by the checkout stand. The carts are especially guided into preliminary alignment with the unloading conveyor.

The conveyor slopes slightly downwardly to its entry, and the bottom of the shipping cart slopes slightly upwardly to its front, with the angle of slope for both of them being the same, as their lengths are substantially interfitted during the conveyor operations. The conveyor has a belt, which is continuously wrapped about spaced cylindrical rollers one at each end of its travel, and the width of the belt is continuous with alternate longitudinal ribs and spaces to interfit with longitudinal members of the basket of the cart. At a crosswise location, the ribs of the conveyor have partial round recesses to receive and to move forward round items in the cart conveying them to the front of the basket. The longitudinal members of the basket are transversely supported across both the front and rear of the cart, but they are not transversely supported at any other location to avoid interference with the moving ribs of the conveyor.

The conveyor, preferably driven by an electric motor drive assembly, located either internally of a roller or externally of a roller, is cleared of a withdrawing cart by rotating its entry end, further into the checkout stand, as the cart is rotated in the opposite direction. The clearing occurs when less than one-half the length of the conveyor is uncovered, so the reversing of the cart during the checking out process is very minimal. These pivotal movements of both the conveyor and the cart are conveniently undertaken by the checker, and the conveyor has a self return mechanism to realign it for the next approaching loaded cart.

The cart is equippped with a child's seat. When no child is being carried the back of the child's seat is pivoted to a reverse sloping position to insure all items loaded above the seat will now slide down to be conveyed out of the cart. When not in use, the cart basket portion is pivoted upwardly and locked for nesting of the cart with other like carts which all have other like tapered portions. Each cart has a centerline alignment member with a roller equipped leading end to enter converging guides equipped with rollers on the conveyor, which all interfit to complete the alignment of a cart with the conveyor pivotally mounted on a pedestal adjacent the checkout stand by the scanner.

In use in a supermarket, this checker-unload overall assembly permits the customer to shop in usual accustomed ways, yet frees the customer of any basket unloading efforts, while minimizing the unloading efforts of the checker. The checker in a no stoop posture and environment operates all components with quick eye-hand coordination movements, all undertaken within an easy reaching distance. The conveyor is selectively and controllably operated by the checker so there is no possibility of any crushing of eggs, breaking of bottles, or other deformations of the items being checked via the scanner and then lowered into bags. Throughout the checking out transactions the checker and the customer may communicate in their face to face positions. All the conveyor mechanisms are within a protective overall assembly, so neither the customer nor the checker can be injured in any way by the operating conveyor. After the customer conveniently directs the loaded cart into position following the guides, the checker thereafter staying at his or her location essentially handles all the remaining cart movements, backing the carts only about twelve inches, and then moving the cart alongside the checkout stand for others to take the cart for immediate reuse or for close together nesting with other like carts.

DESCRIPTION OF THE DRAWINGS

The preferred embodiment of the supermarket checker-unload overall assembly is illustrated in conjunction with the preferred embodiments of the new conveyor, new cart, and new checkout stand in the drawings, wherein:

FIG. 13 is a perspective view of the overall unloading conveyor with selected portions not shown to clarify others;

FIG. 14 is a partial view of the automatic return assembly which returns the conveyor back to its aligned position to receive another cart, after being previously deflected away while clearing an unloaded cart;

in FIG. 19, the loaded cart being aligned with the conveyor, as the alignment structures on both the cart and conveyor are engaging; in FIG. 20, the loaded cart being fully positioned over the conveyor and ready for the unloading of the basket of the cart upon the demand movement of the conveyor by the checker; and in FIG. 21, the unloaded cart being pivoted clear of the conveyor, which is also being pivoted in the opposite direction to clear the cart, the cart, first having been moved directly backward about twelve inches to create the clearance necessary to permit such opposite direction pivoting of the cart and conveyor, the unloaded items being shown transferred to the checkout stand, shown in part;

DESCRIPTIONS OF THE PREFERRED EMBODIMENTS

General Arrangement of Grocery Cart, Unloading Conveyor and Check Out Stand

Figure 1:
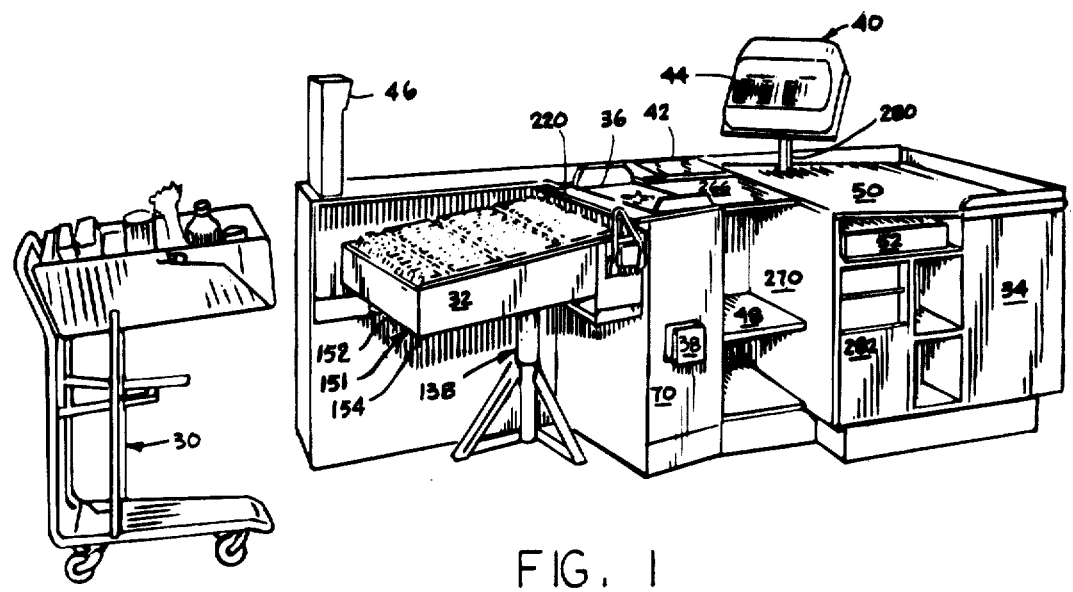
FIG. 1 is a perspective view, in respect to a supermarket, of a checker-unload overall assembly of an approaching cart, a conveyor, and a checkout stand with a scanner and related equipment.

In the drawings, respective preferred embodiments are illustrated of an unloading conveyor, a grocery cart, and a check out stand, with all of them also combined in a preferred embodiment. In FIG. 1, a loaded grocery cart 30 is shown approaching the unloading conveyor 32, which is mounted immediately adjacent the check out stand 34, where the merchandise code scanner 36 is installed. Below the scanner 36 on the side of the check out stand 34, is a knee actuated conveyor start and stop control 38, operated by a person designated as a checker, who removes groceries from the basket of the cart, as the groceries are moved via the conveyor to the front of the cart. As the groceries, one at a time are moved over the scanner, the compilation of the customer's charges are being illustrated in the computer type cash register 40. Those items not coded such as fruits which generally must be weighed and priced, are weighed on scale 42, and the price thereof is entered by finger touches on the keyboard 44 of the register 40. All the pricing is observed by a customer on the display unit 46. The groceries may be bagged by the checker using shelf 48, or moved on to the sloping receiver 50 for subsequent bagging by an assistant. A cash drawer 52 is also located conveniently with all this equipment being operated by the person, designated as the checker, as the customer waits opposite the checker, as illustrated also in FIG. 22.

Aligning the Grocery Cart and Unloading Conveyor

Figure 2:
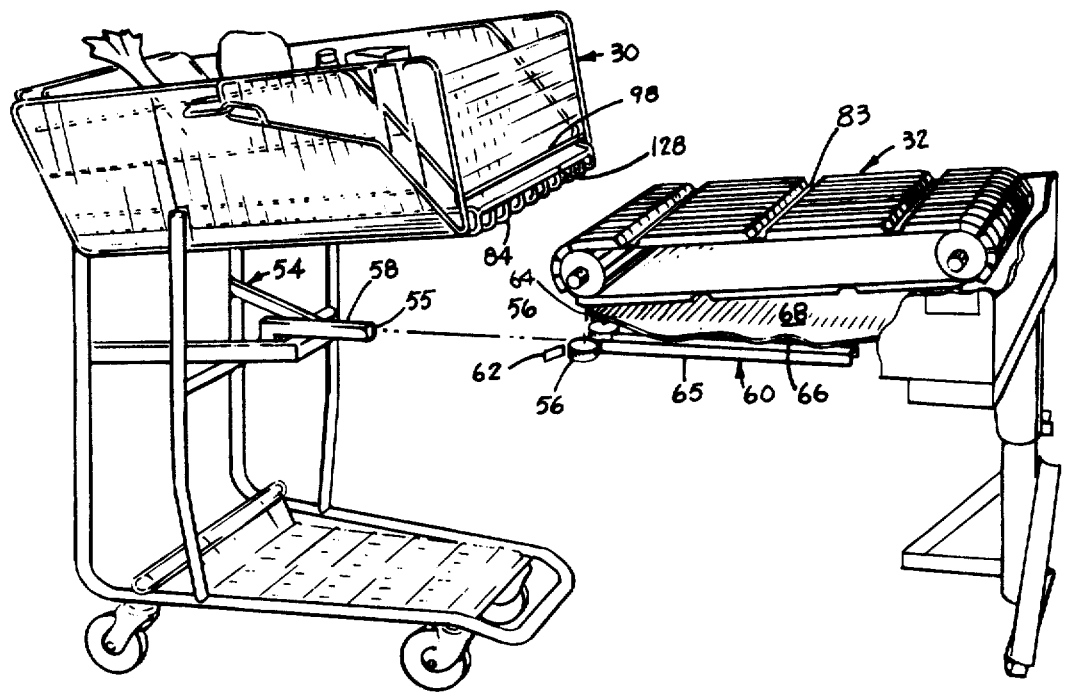
FIG. 2 is a partial perspective view of a loaded cart approaching the conveyor indicating the alignment components.

In FIG. 2, the grocery cart 30 is illustrated with its approaching alignment assembly 54, equipped with a rounded end 55 on a centerline bar 58, being positioned, as a customer, moving the cart 30, approaches the check out stand 34. A receiving alignment assembly 60 of the unloading conveyor 32, is equipped with low friction wheels 56 mounted on a bottom horizontal plate 68. There are front guides 62, 64, leading to the wheels 56. From the wheels 56, there are continuing spaced, straight, alignment guides 65, 66. The customer ably aligns the approaching alignment assembly 54 within the tolerance entry of the spaced low friction wheels 56, followed by the spaced alignment guides 65, 66, and thereafter the receiving alignment assembly 60 directs the cart 30 into full alignment with the unloading conveyor 32.

Access to the Basket of the Cart

Figure 3:
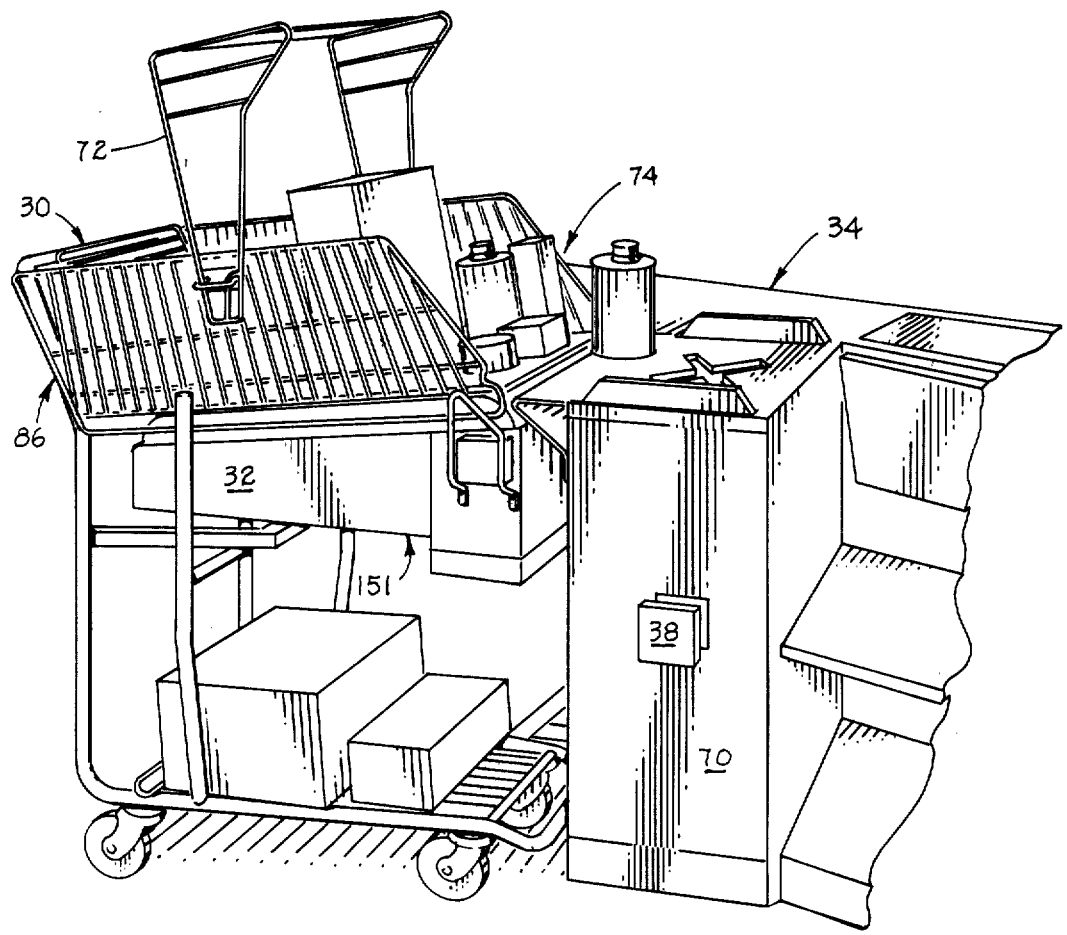
FIG. 3 is a partial perspective view of the loaded cart fully engaged with the conveyor, with its forward end gate raised clear of the items to be conveyed to the front of the cart for their same level scanning, with only a scanning portion of a checkout counter being shown.

In FIG. 3, only a receiving counter portion 70 of a stand is shown, to indicate, how this unloading conveyor 32, and this collecting cart 30 might be used with other types of stands and possibly in other businesses. Also in FIG. 3, the end wrap around pivotal gate 72 of the cart 30 is illustrated in its upwardly tilted and locked position, clearing the movement paths of the checker's final unloading hand movements, which are always made only to this discharging locale 74, as the conveyor 32, on the checker's demamd, moves the purchased items toward the checker.

Interfitting of Basket of the Cart and the Unloading Conveyor

Figure 4:
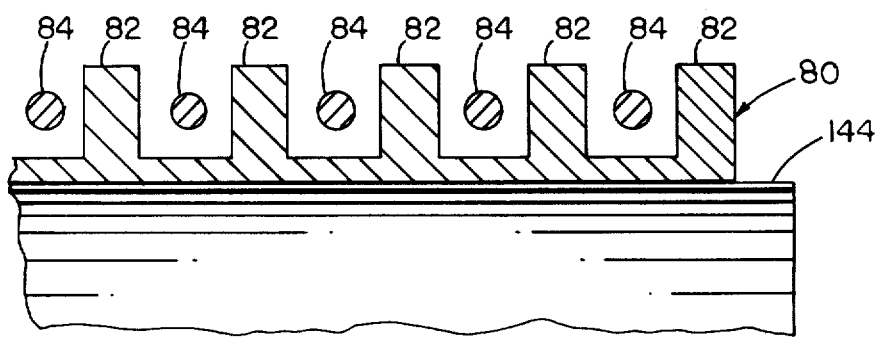
FIG. 4 is a partial cross sectional view illustrating the relative positions of the longitudinal members of the bottom of the basket, the ribs, and spaces of the conveyor belt, and one of the end rollers rotatably supporting the conveyor belt.

In FIG. 4, the relative cross sectional positioning is shown of the continuous unloading conveyor belt 80, with its integral raised longitudinal item contacting and carrying ribs 82, and the bottom spaced longitudinal rods 84 of the basket 86 of the cart 30, when the cart 30 is positioned for unloading. As illustrated in FIGS. 1, 2, 3, and 8, the bottom spaced longitudinal wires or rods 84 and the balance of the basket 86 components are always positioned sloping upwardly. This basket slope or incline is complementary matched by the slope of incline of the unloading conveyor belt 80. This complementary sloping design improves the initial alignment capabilities in preparing to unload the cart 30 with the conveyor 32. Then following unloading, the sloping design permits the disengagement of the cart 30 and the unloading conveyor 32 sooner by allowing the cart 30 to be pivoted or swung, and/or the unloading conveyor 32 to be pivoted or swung in the opposite direction, to clear them one from another, without their otherwise complete end to end in line clearance from one another, as illustrated in FIGS. 18, 19, 20, 21 and 22.

Multiple Positions of the Gate, of the Basket, of the Cart

Figure 5:
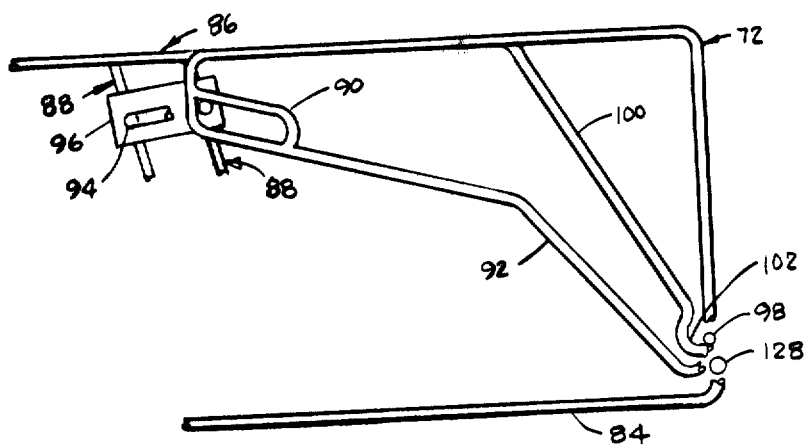
FIGS. 5, 6 and 7 are partial side views of the cam portions of both a side of the basket and a side of the basket and a side of the front gate of the basket indicating, respectively, the locked down position, the locked position of the front gate when the basket is tilted up for nesting, and the locked up position of the front gate when the basket is being unloaded.
Figure 6:
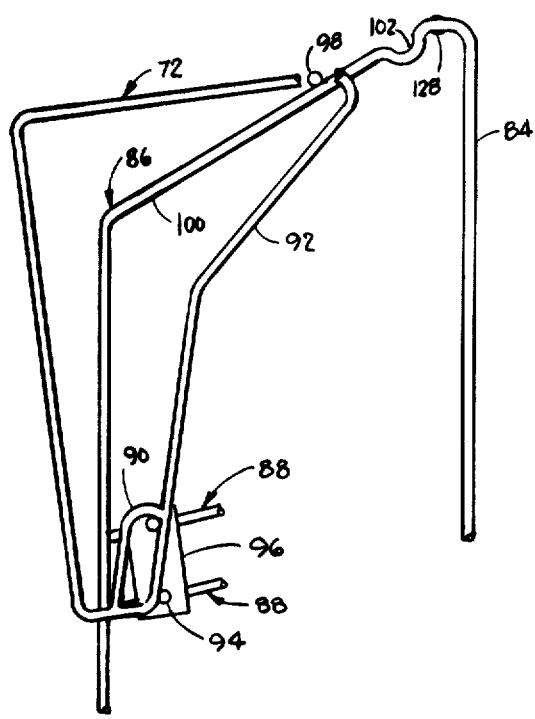
Figure 7:
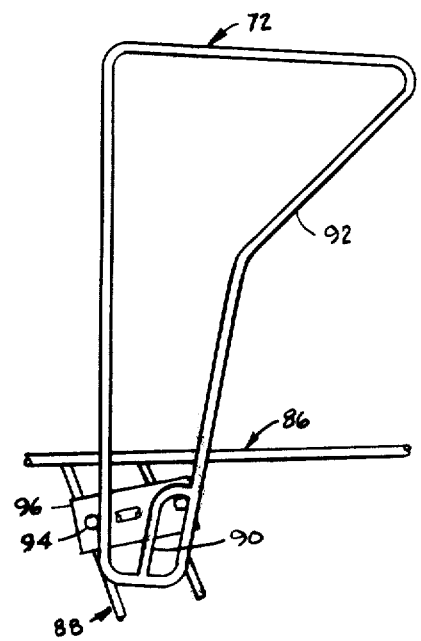
Figure 10:
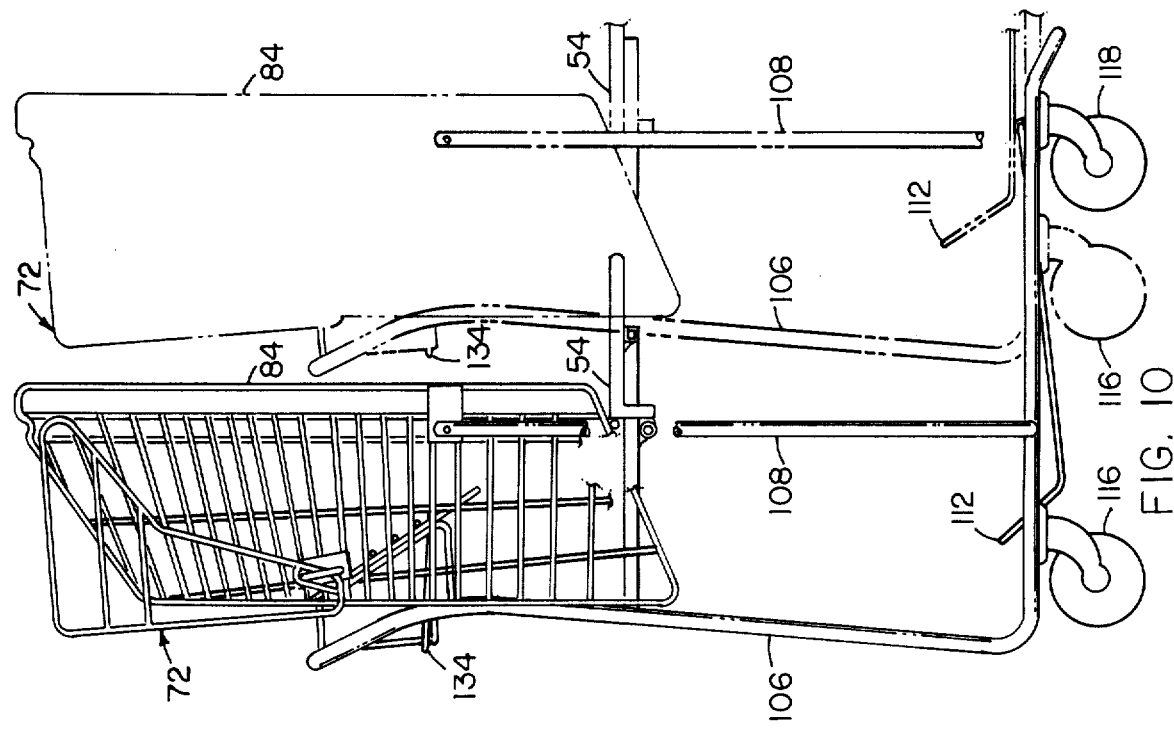
FIGS. 9 and 10 are side views, illustrating in FIG. 9, with some portions removed, the sloping pivotal back of the basket of the cart in the ready to load position, and in FIG. 10 showing how the basket is pivoted upwardly with the front gate continuing to lock itself in place, as the cart is arranged for nesting with an adjacent cart, indicated in phantom lines.

In FIGS. 5, 6, and 7, somewhat schematically, only the cooperating parts of the basket 86 of the cart 30 are illustrated to show how the end wrap around pivotal gate 72 is pivotally mounted to the respective sides 88 of the basket 86. An elongated but restrictive wire loop 90 is formed in the respective wrap around gate sides 92. This loop 90 on gate 72 is slidably and pivotally held captive within an elongated but restrictive wire loop 94 attached to the basket sides 88, by using a bracket 96, secured in turn to the basket sides 88. A lower cross wire 98 of the wrap around gate 72, upon the closure of the gate 72 and somewhat prior to the closure of the gate 72, contacts the downward sloping wires 100 of the basket sides 88. This cooperating arrangement of interrelated elongated but restrictive wire loops 90, 94, arranged in geometric planes perpendicular to one another, and the other wire portions, such as lower cross wire 98 and the sloping wires 100, insures: as illustrated in FIG. 5, the end wrap around gate 72 will remain in place to retain the grocery items within the basket 86; as illustrated in FIG. 6, the gate 72 will not flop off to one side when the entire basket 86 is tilted vertically for nesting of carts 30, as illustrated in FIG. 10; and as illustrated in FIG. 7, the end wrap around gate 72 when intentionally cleared by pivoting it upwardly, will thereafter remain locked in its vertical cleared away position during unloading of the cart 30 by the conveyor 32 and checker. Also, the detents 102 in the sloping wires 100 first receive the lower cross wire 98 during any pivoting of the entire basket 86, such as shown in FIG. 10. If the lower cross wire 98 should leave the detents 102, the interrelated elongated but restrictive wire loops 90, 94 keep the gate 72 from continuing on in a rotative motion beyond the overall profile of the basket 86, as it appears in FIGS. 8, 9, and 10.

The Grocery Cart

Figure 8:
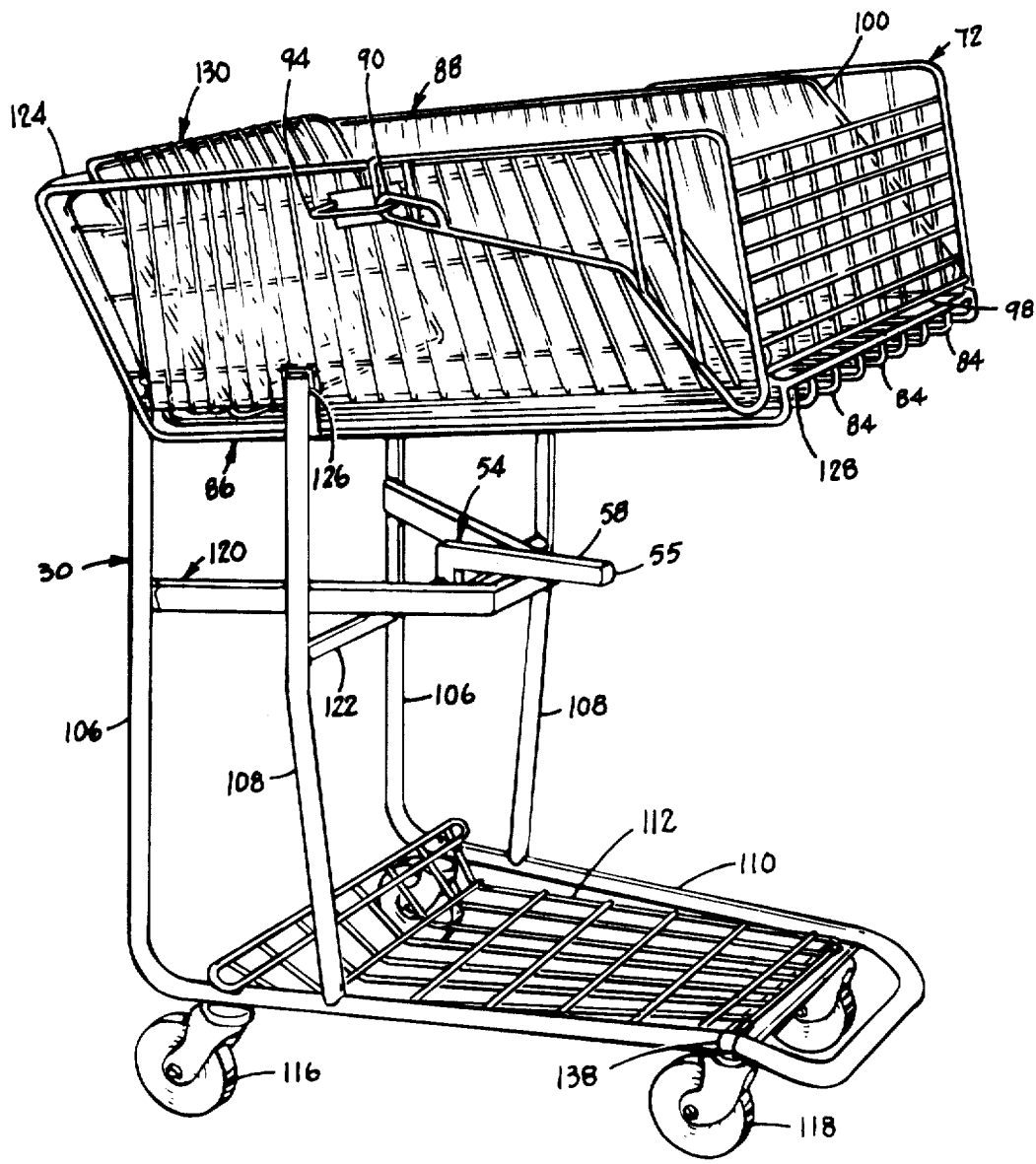
FIG. 8 is a full perspective view of the cart ready for loading by a customer, indicating how the front gate is locked in place and how the alignment structure is ready for its subsequent entry into the alignment structures of the conveyor.

In FIG. 8, in a perspective view, the preferred embodiment of the cart 30 is illustrated, with the numerals designating those components already described, and the following described components: the upright frame members 106 and 108 arranged in opposite side pairs to create the basket height at a convenient reaching height for a checker; a lower tapered nesting frame member 110 integrally connected to the upright frame members 106 and 108, to support an item receiving lower wire shelf 112, and to receive front rotatable casters 118 secured by bracket 138, and rear non rotatable casters 116; a horizontal bracing supporting frame 120 secured to the rear pair of upright frame members 106, and to a cross bar frame member 122, secured between the other pair of upright frame members 108, and used also to position and to hold the approaching alignment assembly 54, with its bar 58 and rounded end 55; a cross handle 124 formed as the pair of upright frame members 106 are continued and tilted to the rear; rotatable support assemblies 126 at the respective top ends of the other upright frame members 108, to receive the basket 86, the forward cross rod or wire 128 to position the longitudinal rods 84; and the collapsible child's seat assembly 130.

The Nesting of the Carts

Figure 9:
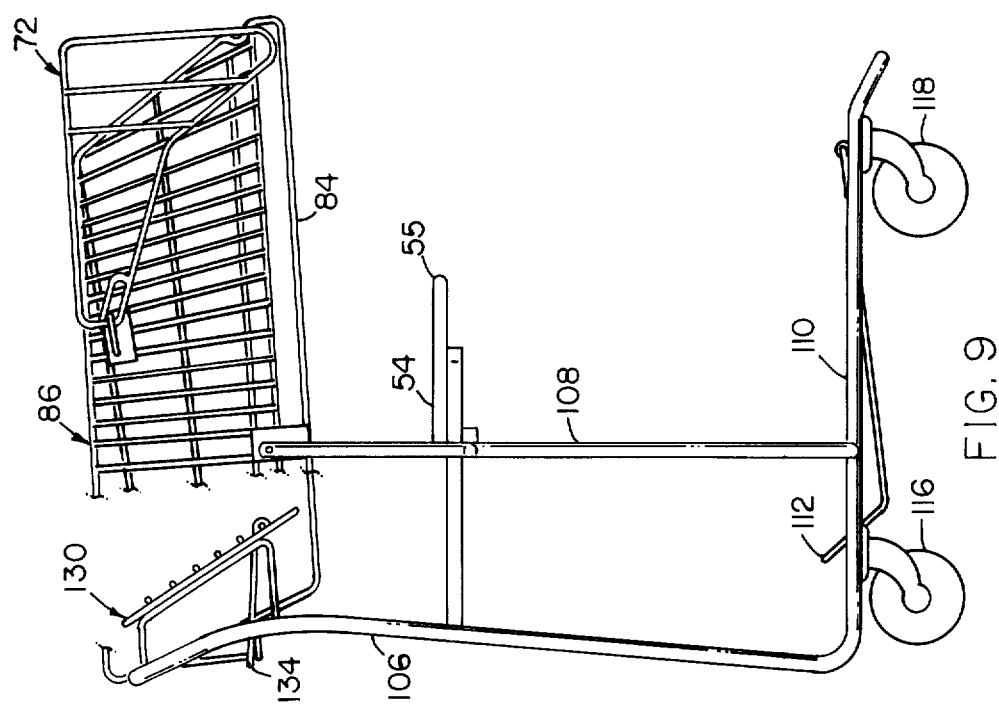

In FIG. 9, the cart 30 is shown with portions cut away to illustrate the non use collapsible position of the child's seat assembly 130, when the seat back 132 forms a sloping back of the basket 86, which insures items in the cart will be directed downwardly to the unloading conveyor 32. From this loading position of the cart 30 shown in FIG. 9, the empty basket 86 is rotated upwardly to a nestable position with an adjacent cart 30, shown in phantom lines in FIG. 10.

Children's Seating

Figure 11:
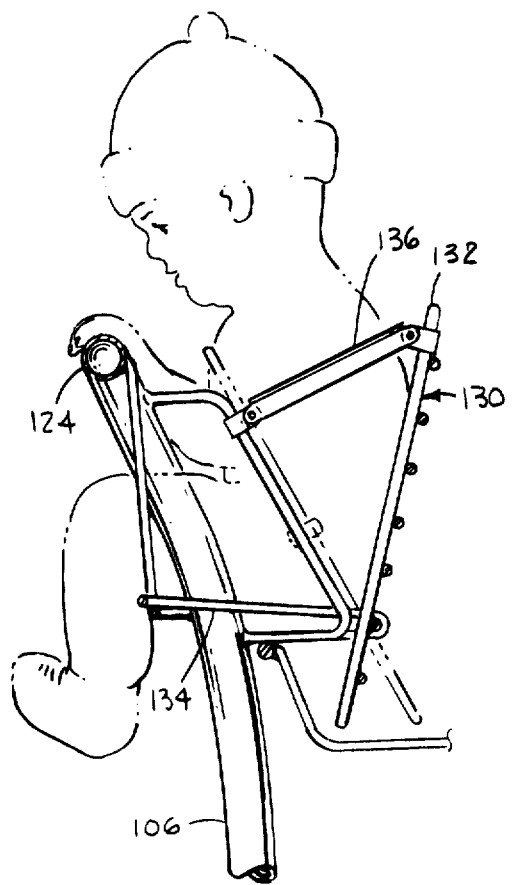
FIGS. 11 and 12 are partial views, side and perspective, illustrating the baby seat.
Figure 12:
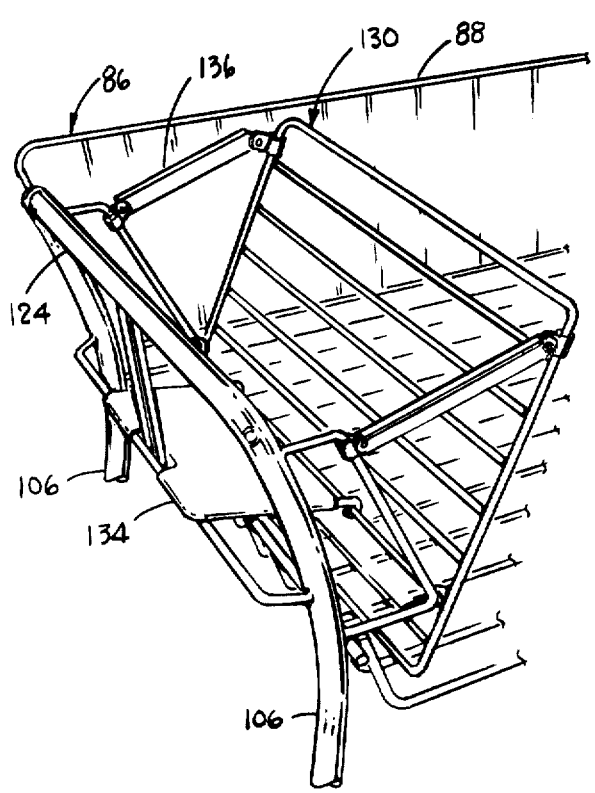

In FIGS. 11 and 12, the collapsible child's seat assembly 130 is shown occupied in FIG. 11, and unoccupied in FIG. 12. A seat 134 and back braces 136 are movably secured, so the assembly 130 is easily converted to the sloping back 132 of the basket 86, as shown in FIG. 9.

The Unloading Conveyor

FIGS. 13 through 17 illustrate the unloading conveyor 32, preferably swingably mounted on a sole pedestal assembly 138, by using handle 139, between assemblies of rotative travel abutments 140, and having an automatic return assembly 142. The unloading conveyor belt 80 has integral spaced ribs 82, which are partially serrated 81 with the cuts being referred to as sipes 81, transversely at sufficiently close longitudinal spacing, so the overall continuous unloading conveyor belt 80, readily makes the reverse directional changes about the respective end drums or rollers 144, 146. Preferably, an electric motor drive assembly 148 is fitted within the driven roller or drum 146, and drum or roller 144 is not powered. Although the interroll powered assembly 148 is illustrated, a separated outside drive assembly is sometimes used. Adjustments of the spacing between these rollers 144, 146 to match the overall longitudinal length of the unloading conveyor belt 80 is undertaken by using the adjustment assemblies 150, located at each respective end mounting locale of the powered roller or drum 146.

Convenient Removal of Entire Unloading Conveyor Belt Assembly

As illustrated in FIGS. 1, 2, 3 and 14 an assembly 151 of decorative and safety end, side and bottom panels 152, 154, 68 cover the unloading conveyor belt assembly and they are conveniently removed as an assembly 151. Then after removing fasteners 153 the slider fairing 155 is transversely removed from in between the belt 82. Thereafter for servicing, the powered roller or drum 146 is cleared of its mounting, after increasing the transverse spacing of the upright supports 156, 158, such as by loosening the fasteners 160 at one end. This occurs as the fixed non rotatable centered rod support or shaft 162 of the powered roller or drum 146, is also cleared from the elongated bearing slot 164, and consequently the powered roller 146 and its internally mounted electric motor drive assembly 148, and this end of the unloading conveyor belt 80 are all cleared to be moved toward the locale of the non powered roller or drum 144. At this time of disassembly, then a transverse framework 166 supporting the shaft 168 of the non powered roller or drum 144 and the then respective end of the unloading conveyor belt 80, is first released by withdrawing threaded bolts 165 from threaded upstanding welded tabs 167 on the transverse framework 166. Thereafter this framework 166 and all it supports are readily moved down and then in a horizontal direction, clearing the respective side located slide engagement paired angle supports 170, 172. Support 170 is secured to the transverse framework 166, and support 172 is secured to horizontal surrounding structural bar frame 174 supported by the upright supports 156, 158 and held by fasteners 175. The complete powered unloading conveyor belt 80, while still installed about the rollers 144, 146, is removed in this sequence, for its complete interchange with another like subassembly 180, or for its on the spot convenient inspection, service, and possible repair. At least at one transverse location the ribs 82 of the conveyor belt 80 are each formed with a depression 83. When these collectively meet a round container they cooperate together to move the round container on to the discharge locale.

Figure 15:
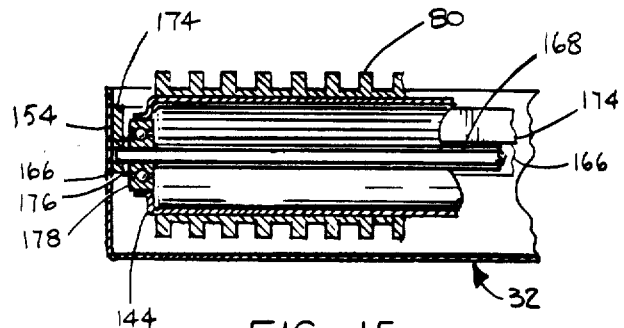
FIG. 15 is a partial cross sectional view of the non powered roller of the unloading conveyor, its rolling support of the conveyor belt, and its own shaft and bearing mounting supports.

FIG. 15 is a partial side view of the transverse side by side components illustrated in reference to loading end of the powered unloading conveyor 32 to indicate their arrangement, especially in reference to rotatably supporting the non powered roller or drum 144. From outside to inside are: the decorative and safety side panel 154, the transverse framework 166, the horizontal surrounding structural frame 174, the non rotatable shaft 168, washer 176, bearing 178, non powered roller or drum 144, and the unloading conveyor belt 80.

Figure 16:
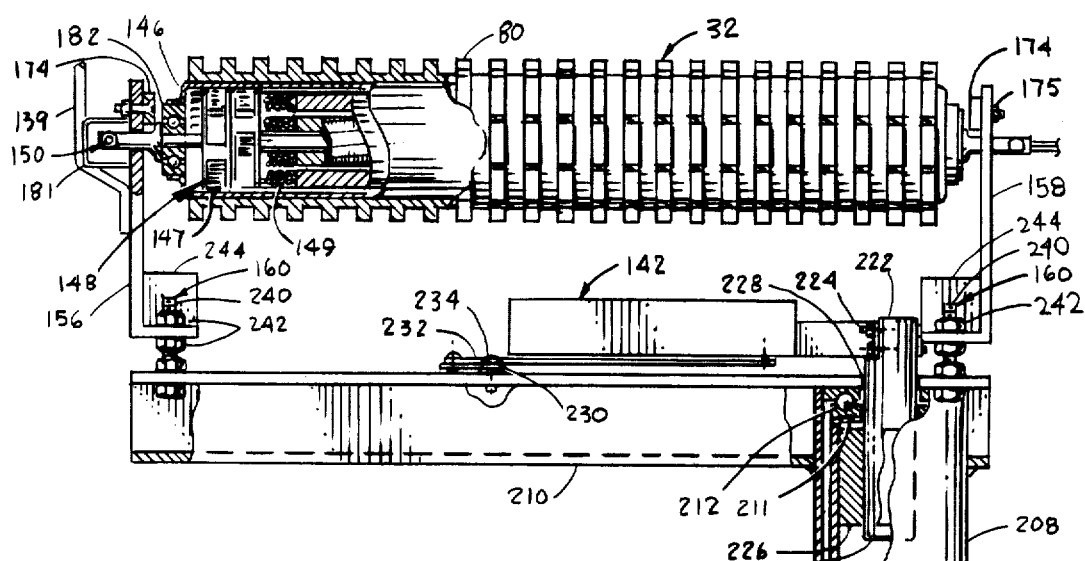
FIG. 16 is a partial cross sectional view of the powered roller of the unloading conveyor, its powered rolling support of the conveyor belt, and its own shaft and bearing mounting supports, and also shown are the components of the pedestal mounting of the overall unloading conveyor.

FIG. 16 is a partial side view showing the transverse side by side components illustrated in reference to the unloading end of the powered unloading conveyor 32 to indicate their arrangement, especially in reference to rotatably supporting the powered roller or drum 146. From outside to inside are the handle 1, cover 181, belt length adjustment assembly 150, upright support 156, the horizontal surrounding structural frame 174, bearing 182 for powered roller 146.

Figure 17:
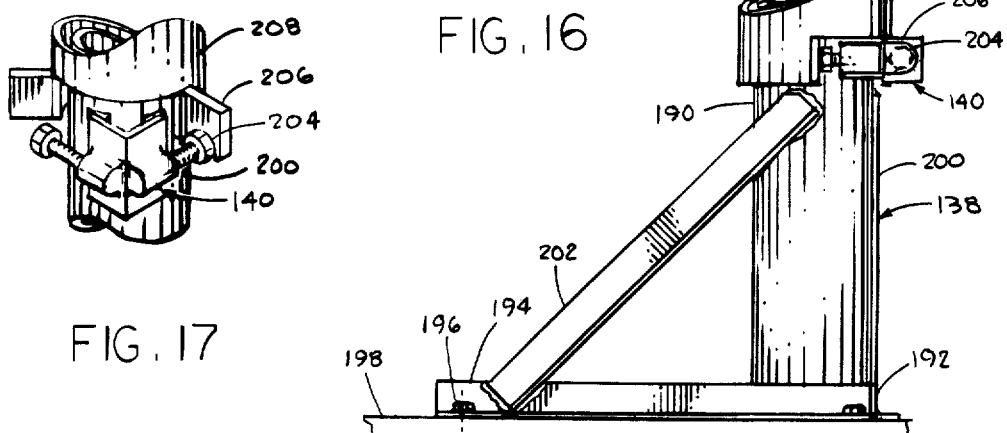
FIG. 17 is a partial perspective view of the rotary travel stops, between which the unloading conveyor is moved to clear a departing grocery cart, and thereafter is returned by the automatic return assembly to be in line for the next oncoming grocery cart.
Figure 18:
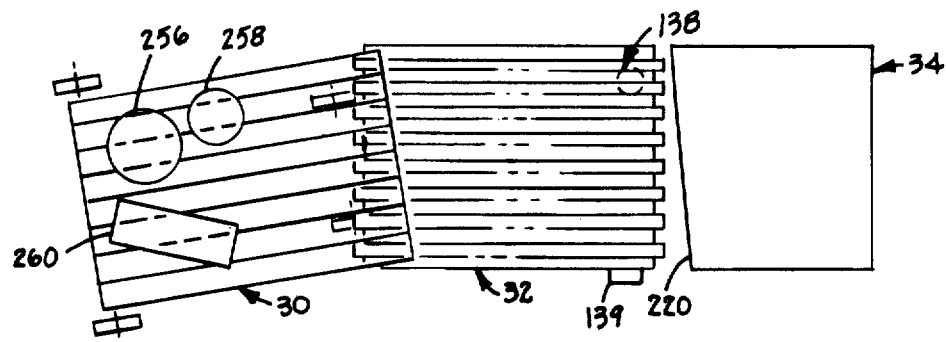
FIGS. 18, 19, 20 and 21, are schematic partial top views illustrating in FIG. 18 the approaching loaded cart commencing its overlay of the conveyor.
Figure 19:
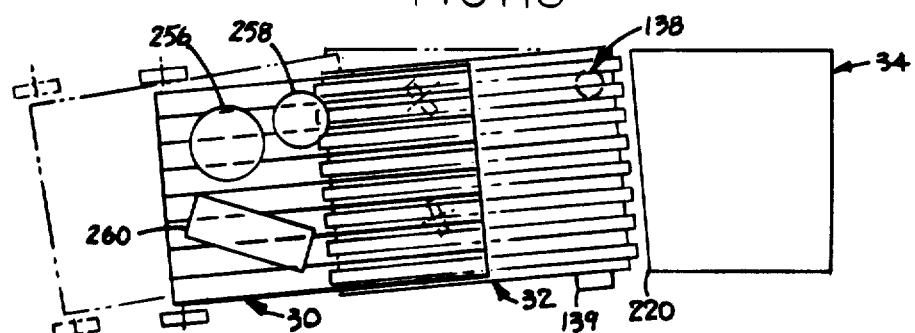
Figure 20:
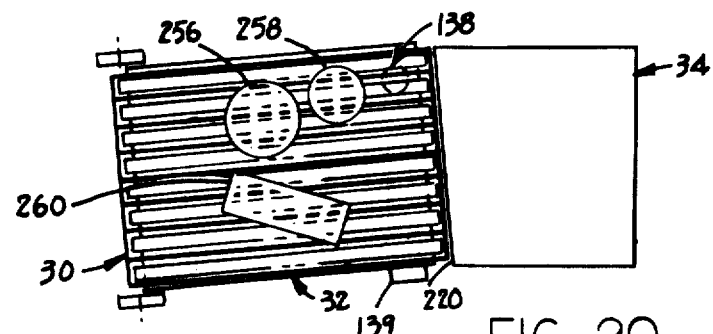

Corner Located Swingable, Automatic Return Lift Off Pedestal Mounting of the Unloading Conveyor Also in FIGS. 16 and 17, parts are broken away to illustrate the preferred arrangement of the components of the sole pedestal mounting assembly 138, which movably supports the unloading conveyor 32. A structural supporting tube or pipe 190 with horizontal perpendicular arranged base angles 192, 194, permanently attached to it, is ultimately, with fasteners 196, secured to the floor structure 198 of a market, utilizing also permanently attached diagonally arranged bracing angles 200, 202. Adjustable abutment stops 204 are selectively spaced and secured to the supporting tube 190 to cooperate with other abutment stops 206 on a rotatable or swingable telescoping sleeve tube, or pipe 208, which continues on the sole pedestal mounting assembly 138. A transverse supporting box beam 210 is permanently secured to the top of the telescoping sleeve 208, and these two parts are rotatably supported on the end of the supporting tube 190 by using thrust bearing 212. The top of the supporting tube 190 is partially capped by the ring 211, which supports the thrust bearing 212.

The unloading conveyor 32 is swingable partially into the check out stand during the disengaging of the grocery cart 30, upon a movement initiated by the checker using handle 139. When the handle 139 is released, the unloading conveyor 32 automatically returns to its position with its discharging end located immediately adjacent the abutment structure 220 of the check out stand 34, adjacent the code scanner 36, to await the oncoming cart 30 of the next customer coming to this check out stand 34. An automatic return assembly 142, preferably hydraulic, is removably secured to a vertical bar 222, using fasteners 224, and the bar 222 in turn is permanently secured to the top of the supporting tube 190, via a filler ring 226. Cutouts 228 in the box beam 210 provide the clearance for the vertical position of the bar 222 for its in turn support of the return assembly 142. The terminus 230 of the linkage 232 of the automatic return assembly is secured to the box beam by a bearing fastening assembly 234.

Adjustability of the Angle of the Unloading Conveyor Belt to Match the Angle of the Basket of the Grocery Cart As shown in FIGS. 13, 14 and 16, the upright supports 156 and 158 for the powered roller 146 and the horizontal surrounding structural frame 174, are adjustably mounted to the box beam 210, by using vertical height adjustable fastener assemblies 160 secured to the box beam 210. In respect to these assemblies 160, by turning nuts 242 on bolts 240, located above and below positioning angles 244, secured to the upright supports 156 and 158, at two spaced locations on each end of the box beam 210, the angle of the geometric plane of the unloading conveyor belt 80 is adjusted relative to the horizontal geometric plane to match the slopes of the bottoms of the baskets 86 of the carts 30, to complete the excellent positioning of the integral ribs 82 of the unloading conveyor belt 80 with the longitudinal rods or wires 84 of the baskets 86 of the cart 30.

Figure 21:
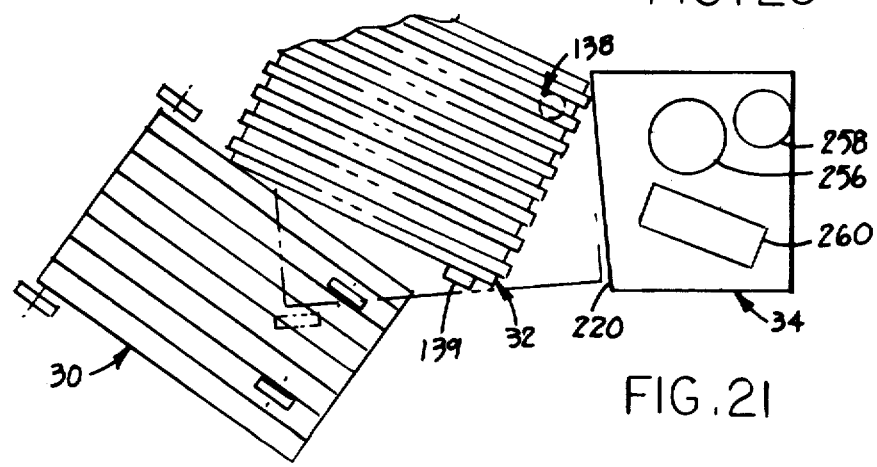
Figure 22:
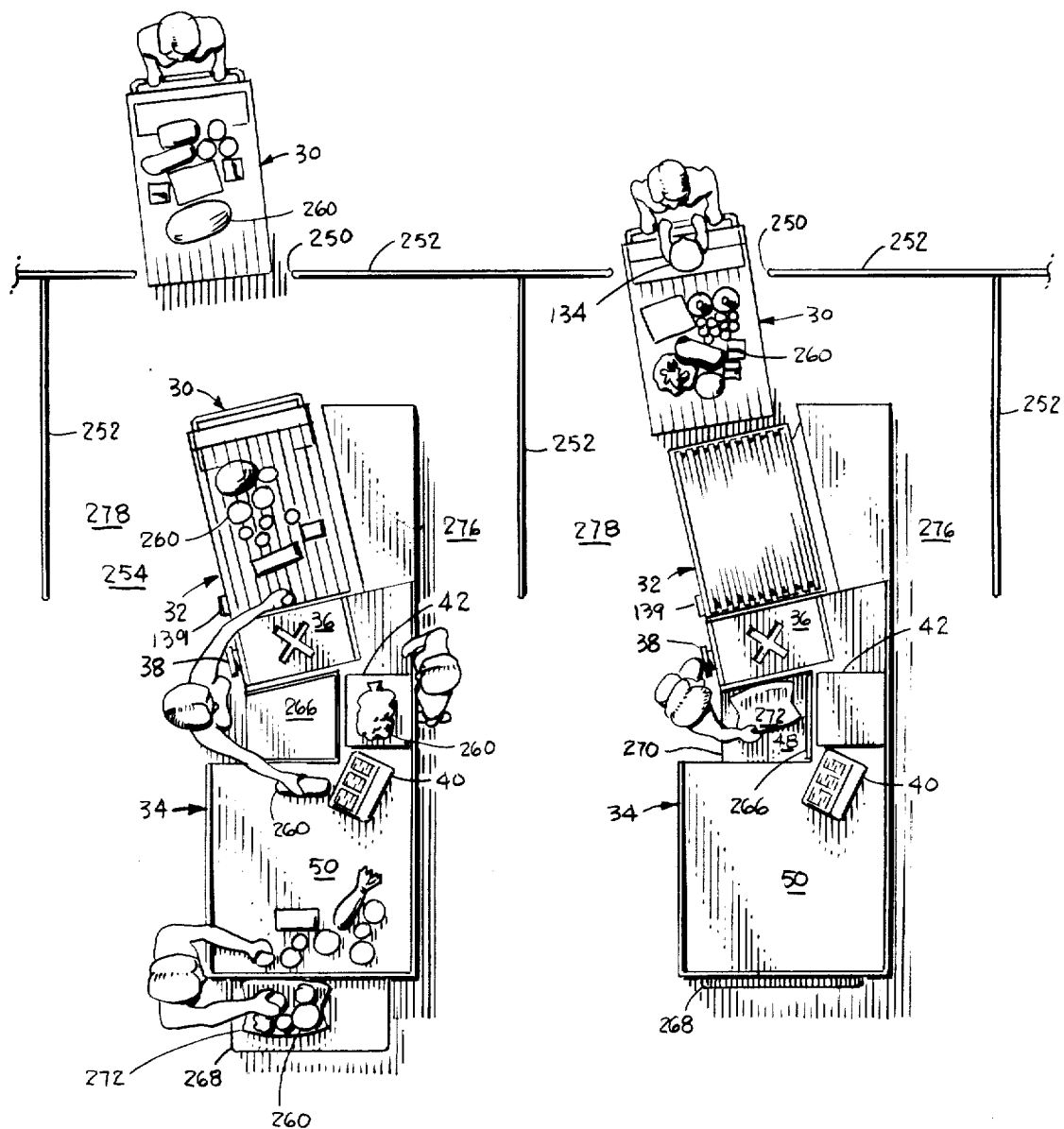
FIG. 22 is a top view of two sides by side checkout stand areas indicating the interrelationship of the adjacent checkout stands, their guiding partitions, and carts waiting beyond the guiding partitions, a cart about to commence its engagement with the conveyor, a cart engaged with the conveyor, and the respective positions of the checkers and the customers.

The Overall Method of Checking Out a Customer Using This Cart, Unloading Conveyor, and Check Out Stand As illustrated in FIG. 22, a customer arriving at a check out stand 34 area may wait briefly on occasions at an entrance 250 through low vertical panels 252 designating a check out area 254, until a preceding customer is checked out, then she or he will proceed on to engage her or his cart 30 with the unloading conveyor 32, as illustrated in FIGS. 2, 18, 19 and 20. The alignment assembly 54 on the cart 30 and the alignment assembly 60 on the unloading conveyor 32, as shown in FIG. 2, make it relatively easy for the customer to complete both the approach and interengagement motions of the cart 30, illustrated in FIGS. 18, 19 and 20. Then as shown in FIG. 21, after the grocery items 256, 258 and 260 are on the check out stand 34, bagged, or otherwise removed from the cart 30, the cart 30, after being withdrawn only a short distance, so the like sloping portions of the cart 30 and unloading conveyor 32 are cleared of one another, is swung in one direction, as the unloading conveyor 32 is swung in the other direction, to fully clear one from the other, wihout requiring the otherwise full in line reverse motion of the cart to clear its entire basket length from the unloading conveyor 32. These methods and motions minimize the floor areas needed and eliminate the need for asking oncoming customers to back up their carts 30 to clear an emptied cart 30 upon leaving the check out stand 34.

In FIG. 22, a rush hour checking out period is illustrated, indicating a waiting cart 30, a cart 30 aligned over the unloading conveyor 32, as the checker is operating the unloading conveyor 32, passing the grocery items over the code scanner 36, a bridge 266, and on to the sloping receiver 50 of the check out stand 34 to a rear bagging locale, being attended by a person designated as a bagger, using rear bagging shelf 268. The scale 42 and the register 40 are within the convenient arm and hand movement of the checker. The customer is able to stand opposite the checker to observe the overall operations and to attend to the payment for the purchased items. At other store hours, when the volume of business is less, as also illustrated in FIG. 22, more of the check out stands 34 may be operated by one person instead of two persons. As a customer approaches with her baby seated in the basket seat 134 of the cart 30, the unloading conveyor 32 has been automatically returned, and the checker has slidably moved the bridge 266 out of the way to clear the volume or well 270 above a bagging shelf 48, and then has placed an opened bag 272 on the shelf 48 in preparing to check out the items selected by this customer.

These side by side check out stands 34, utilizing the carts 30 and unloading conveyors 32 arranged for either single or double manning, in this overall embodiment, are preferably positioned within a seven foot six inch wide modular space, which includes the customer aisle 276, the checkstand 34, and cart passage 278 on the checker's side. The overall length of the modular space from the entrance 250 through the vertical panels 252, to the end of the check out stand 34 is eleven feet, with the overall length of the check out stand being nine feet. The entrance or opening 250 serves three purposes: to align the cart 30 for entry onto the unloading conveyor 32; to prevent other customers from moving in front of a second or waiting customer; and to eliminate any ripple effect, otherwise to be caused when a customer or customers might have to back up their loaded carts 30, as an empty cart 30 is moved clear of an unloading conveyor 32. Also a customer positioned opposite the checker, face to face, has a private space in which to complete his or her transaction with the checker.

As illustrated in FIGS. 1 and 22, the checker is only required to perform minimum movements during the checking operations. The code scanner 36 is located at a comfortable, non fatiguing thirty six inch height creating an optimum no stoop environment. Electronic components, i.e. the register 40, the scale 42, are closely grouped providing quick eye-hand coordination of the checker, for key entry of the costs of the purchased items. The keyboard 44, i.e. the register 40, is mounted on an adjustable pedestal 280, with respect to height, direction, and angle of the keyboard 44. There is a nearby pop out bag dispenser 282, which delivers bags 272 to the checkers' fingertips. Moreover, at all times through the knee operated conveyor control 38, the checker moves the purchased items to the front of the cart 30 for his or her very convenient handling immediately adjacent the code scanner 36, for their quick passage over the code scanner 36 and subsequent convenient bagging.

By utilizing these preferred embodiments of the grocery cart 30, the unloading conveyor 32, and the check out stand 34, in their preferred combination, the overall check out speed advantage potentials of installed code scanners 36 are fully realized, to the benefit of the store owners and their operating personnel, and also to the benefit of the customers, who, although helping to align the cart 30 and to direct it over the unloading conveyor 32, thereafter do not participate in the unloading of the items purchased from the basket 86 of the grocery cart 30.

I claim:

1. In combination for installation and use in a market, a grocery cart for customers to load with their selected groceries, an unloading conveyor, sequentially and temporarily interfitted with arriving grocery carts, located immediately adjacent to a checkout stand, and operated by a checker to move the selected groceries to the front of the grocery cart to be conveniently picked up by the checker, and a checkout stand located nearby the end of the unloading conveyor, and related pricing, and money changing equipment, located within a convenient distance of the checker's sole location, comprising:

(a) a grocery cart having a basket with a bottom of equally spaced longitudinal members sloping upwardly and forwardly such that the forward portion of the bottom of the basket is raised slightly above the rear portion of the bottom of the basket and the longitudinal members define a plurality of parallel continuous unobstructed passages from rear to front along the bottom of the basket;

(b) an unloading conveyor having equally spaced longitudinal ribs adapted to extend up through and along the parallel unobstructed passages alongside the equally spaced longitudinal members of the bottom of the basket of the grocery cart, and which slope in a complimentary fashion parallel to the slope of the bottom of the basket at such an elevation that the ribs will pass through the parallel passages when the basket of the cart is positioned over the conveyor;

(c) the checkout stand positioned immediately adjacent the unloading conveyor, for receiving groceries just after they are removed from the basket, where the groceries have been moved forward, while resting upon the equally spaced longitudinal ribs of the conveyor belt; and (d) the spaced longitudinal members forming the bottom of the basket being upturned at their forward ends to provide clearance above the longitudinal ribs and being transversely joined together at their ends by a cross member, such that the longitudinal ribs of the conveyor can readily pass beneath the cross member without interference.

2. The combination, as claimed in claim 1, wherein the unloading conveyor is swingably mounted, so after the groceries are checked, then after a slight in line reversing, there is created a vertical clearance of the basket bottom from the conveyor belt ribs, before the longitudinal clearance of the basket bottom from over the conveyor, and then the unloading conveyor is swung to one side and the grocery cart is oppositely swung, to clear them from one another, and thereafter the empty grocery cart is moved by the checker toward a reuse locale.

3. The combination, as claimed in claim 2, wherein the unloading conveyor is equipped with an automatic return assembly, so after the checker swings the unloading conveyor to one side to clear the basket bottom, and clears the grocery cart, then as the checker releases the unloading conveyor it returns to an unloading position to again be interfitted with an oncoming loaded grocery cart.

4. The combination, as claimed in claims 1, 2 or 3, wherein the unloading conveyor is equipped with a slope adjusting assembly, to match, as necessary, the sloping upwardly and forwardly equally spaced longitudinal ribs of the conveyor belt to the sloping upwardly and forwardly equally spaced longitudinal members of the bottom of the basket of the grocery cart, so upon full interengagement of the grocery cart with the unloading conveyor, the spaced longitudinal ribs will uniformly move up and alongside the longitudinal members of the basket to movably contact the groceries and carry them, on demand of the checker, to the front of the basket.

5. The combination, as claimed in claim 2, wherein the checkout stand includes an extending shelf portion alongside the unloading conveyor having sufficient clearance, so the unloading conveyor swings, in part, below the shelf portion, when the unloading conveyor is swung to one side and the grocery cart is oppositely swung to clear them from one another.

6. The combination, as claimed in claim 1, wherein the basket of the grocery cart has a front gate which is pivotally mounted to be raised up and clear of the groceries, by the checker's convenient manipulation, after the grocery cart has been fully engaged with the unloading conveyor.

7. The combination, as claimed in claim 1, wherein the checkout stand has a partial angular cutout portion to receive at a horizontal angle the unloading conveyor, which in turn is so angled to receive an approaching grocery cart.

8. The combination, as claimed in claim 7, wherein the checkout stand has vertical panels spaced to form an entry for grocery carts into a checkout area, whereby the grocery carts will be directed on an angular directional course to the unloading conveyor of the checkout stand.

9. The combination, as claimed in claim 1, wherein the checkout stand has a shelf just beyond the code scanner at the same level to be used by the checker to directly move checked groceries beyond, and an extending downwardly sloping counter to collect checked groceries for their bagging by an assistat helping the checker during rush hours, and upon relocation of this shelf, a lower bagging shelf located below it, is cleared to receive a bag, so during non rush hours the checker may bag groceries at this location, just beyond and essentially adjacent the code scanner, within the overall convenient arm length and height operational locale of the checker.

10. The combination, as claimed in claim 1, wherein the checkout stand has all accounting equipment used by the checker in computing prices located in a tiltable and swingable pedestal mounting for selective placement by respective checkers within the convenient hand and arm movement of the checker.

11. The combination, as claimed in claim 1, wherein the checkout stand has accounting readout equipment positioned to present the display of pricing information to a customer positioned on the opposite side of the checkout stand directly across from the checker.

12. The combination, as claimed in claim 1, wherein the checkout stand has controls mounted at knee height of a checker for the starting and stopping of the unloading conveyor.

13. The combination, as claimed in claim 1, wherein the checkout stand has a cash drawer installed immediately adjacent to the standing locale of the checker.

14. The combination, as claimed in claim 9, wherein the checkout stand has a cash drawer installed just below the extending downwardly sloping counter immediately adjacent to the standing locale of the checker.

15. The combination, as claimed in claim 1, wherein the checkout stand has a bag dispenser installed immediately adjacent to the standing locale of the checker.

16. The combination, as claimed in claim 2, wherein the swingably mounted unloading conveyor has a handle adjacent the scanner locale for use by the checker in swinging the conveyor in one direction as the grocery cart is swung in the other direction during their clearance from one another.

17. The combination, as claimed in claim 2, wherein a single pedestal is floor mountable to in turn rotatably mount the unloading conveyor.

18. The combination, as claimed in claim 1, wherein the grocery cart has an alignment assembly, and the unloading conveyor has an alignment assembly which are used together to guide the grocery cart into alignment with the unloading conveyor, so the equally spaced longitudinal ribs of the conveyor belt will move up and alongside the longitudinal members of the bottom of the basket of the grocery cart.

19. An unloading conveyor for moving customer selected items to the front of a basket of a cart, comprising:
 (a) a support to position the unloading conveyor at the elevation of a bottom of a basket of a cart;
 (b) a frame secured to the support;
 (c) a conveyor secured to the frame, comprising in turn:
  (1) a drive unit supported by the frame;
  (2) a driven roller driven by the drive unit and rotatably supported by the frame;
  (3) an idler roller rotatably supported by the frame and spaced from the driven roller;
  (4) a conveyor belt for continuous travel about the spaced driven roller and the idler roller, when the drive unit is operating, having a solid width with upstanding equally spaced longitudinal ribs of such height to prevent interference from the web for movement through a bottom of a cart to move customer selected items to a front of a basket of a cart.

20. An unloading conveyor, as claimed in claim 19, wherein the frame secured to the support is rotatably secured, so the frame, rollers, conveyor belt and drive unit, as an assembly, are swingable to one side during clearance maneuvers, when a basket of a cart, after unloading, is swung in the opposite direction.

21. An unloading conveyor, as claimed in claim 19, wherein the support to position the unloading conveyor is a multiple part pedestal support located at a corner to rotatably and tiltably support the assembly of the frame, drive unit, driven roller, idler roller, and conveyor belt.

22. An unloading conveyor, as claimed in claim 21, wherein a handle is secured to the frame to be used by a checker to swing the conveyor belt clear of a bottom of a basket.

23. An unloading conveyor, as claimed in claim 21 or 22 wherein the multiple part pedestal support also has an automatic return assembly to return the assembly of the frame, drive unit, driven roller, idler roller, and conveyor belt to a position to receive an oncoming cart.

24. An unloading conveyor, as claimed in claim 19 having controls for the drive unit placed at knee height of a checker.

25. An unloading conveyor, as claimed in claim 19, wherein the frame has adjustable supports to alter the distance between the driven roller and the idler roller to match the length of the conveyor belt.

26. An unloading conveyor, as claimed in claim 19, wherein the frame has separating supports to be cleared of the driven roller and the idler roller, whereupon the assembly of these rollers and the conveyor belt may be removed conveniently for inspection, repair, or replacement.

27. An unloading conveyor, as claimed in claim 19, wherein a slider top is removably secured on the frame to slidably support the conveyor belt moving customer selected items to the front of a basket of a cart.

28. An unloading conveyor, as claimed in claim 19, wherein across the width of the conveyor belt at least at one transverse locale the upstanding equally spaced longitudinal ribs are reduced in height to form a transverse channel to receive portions of round customer selected items and thereby deliver such round items to the front end of the basket for pick up by a checker.

29. An unloading conveyor, as claimed in claim 19 having a safety-decor siding and bottom secured to the frame to cover over any unwanted access to moving portions of the unloading conveyor.

30. An unloading conveyor, as claimed in claim 19, wherein the frame supports an alignment assembly to cooperate with an alignment assembly on a cart to align an oncoming cart filled with customer selected items with the unloading conveyor.

31. An unloading conveyor, as claimed in claim 30, wherein the alignment assembly of the unloading conveyor comprises spaced apart members determining a channel, and at the entry of this channel on each side are rotatable guides to non frictionally receive and guide the alignment assembly on a cart into the channel.

32. An unloading conveyor, as claimed in claim 19 wherein both the driven roller and idler roller comprise cylinders having bearings mounted in part internally at their ends, and mounted in part to non rotatably mounted end shafts, mounted in turn to the frame.

33. An unloading conveyor, as claimed in claim 32, wherein the drive unit supported by the frame is indirectly supported by the frame, which in turn supports the non rotatably mounted end shafts, and inside the driven roller the components of an electric motor, serving as the drive unit, are secured in part to the cylinder and in part to a non rotatably mounted end shaft.

34. A grocery cart for receiving customer selected items in a basket which items later are moved by an unloading conveyor to the front of the basket, comprising:
 (a) a frame;
 (b) wheels secured at the bottom of the frame;
 (c) a basket secured to the frame and having a bottom of equally spaced longitudinal members;
 (d) the longitudinal members defining a plurality of parallel continuous unobstructed passages from rear to front along the bottom of the basket;
 (e) the spaced longitudinal members being upturned at their forward ends to provide a clearance for conveyor ribs; and
 (f) the forward ends being transversely joined together at their ends by a cross member.

35. A grocery cart, as claimed in claim 34, wherein the basket is secured to the frame so the bottom equally spaced longitudinal members slope upwardly and forwardly toward the front of the basket.

36. A grocery cart, as claimed in claim 34 or 35, wherein the basket is rotatably secured to the frame for nesting of this grocery cart to an adjacent grocery cart, as the basket is rotated upwardly to a vertical position.

37. A grocery cart, as claimed in claim 34 or 35, wherein an alignment assembly is mounted on the frame and used in conjunction with an alignment assembly on an unloading conveyor.

38. A grocery cart, as claimed in claim 37, wherein the alignment assembly mounted on the frame positions a centered single extending member for entry between spaced alignment members of an alignment assembly on an unloading conveyor.

39. A grocery cart, as claimed in claim 34, wherein portions of the frame extend upwardly and are inclined rearwardly and include a cross member to serve as a handle for controlling the cart.

40. A grocery cart, as claimed in claim 34 or 35, wherein the basket has a front, which is pivotally secured to the sides of the basket, and when unloading of the basket is to occur the front of the basket is pivoted upwardly clear of the front of the basket by the checker to an upwardly locked position presenting the customer selected items to the checker free from obstruction.

41. A grocery cart, as claimed in claims 34 or 35, wherein the basket has a front, which has wrap around side portions, which are pivotally secured to the central portions of the sides of the basket using interlockable respective loops located at right angles to one another, whereby when the basket is rotated vertically for nesting the front via the interlocked loops remains in place covering the otherwise open front end of the basket then directed upwardly and whereby when the front is pivoted upwardly and rearwardly during unloading of the basket, it remains locked in place via the interlocked loops.

42. A grocery cart, as claimed in claims 35 or 41, wherein the basket has sides which at their fronts have a curved receiving detent, and the pivotal front of the basket has a cross rod which drops into the curved receiving detents to hold the front in position, as the basket is pivoted upwardly into a vertical position.

43. A method of checking out customer selected items from a grocery store, comprising:
 (a) placing selected items by the customer on an upwardly sloping arrangement of spaced longitudinal members of a basket of a grocery cart;
 (b) directing the grocery cart by the customer over spaced longitudinal ribs of an unloading conveyor so they are higher in elevation than the spaced longitudinal members of a basket and so they are coextensive with the spaced longitudinal members of the basket;
 (c) operating the unloading conveyor by the checker to move the customer selected items to the front of the basket as they are carried by the spaced longitudinal ribs of the unloading conveyor;
 (d) removing the customer selected items by the checker when they reach the front of the basket;
 (e) directing the removed selected items by the checker over a code scanner; and
 (f) packaging the scanned selected items by the checker.

44. The method of checking out customers, as claimed in claim 43, comprising the additional steps of:
 (a) partially withdrawing the grocery cart from the unloading conveyor by the checker;
 (b) pivoting the conveyor in one rotary direction and pivoting the grocery cart in the other rotary direction by the checker; and (c) moving the grocery cart forward again clearing the unloading conveyor by the checker.

45. An unloading conveyor for moving customer selected items to the front of a basket of a cart, comprising:
(a) a support having an unloading conveyor mounted thereon;
(b) the unloading conveyor having a plurality of parallel longitudinal ribs of movement through the bottom of the basket to move customers selected items to the front thereof;
(c) adjusting means associated with the conveyor and support for adjusting the height of the conveyor with respect to the bottom of the basket such that the longitudinal ribs come into desired accurate interengagement along the bottom of the basket.

46. The unloading conveyor for moving customer selected items to the front of a basket of a cart as set forth in claim 45, wherein:
(a) the conveyor ribs slope upwardly and forwardly in the direction of the unloading operation at a small angle which matches the bottom of the cart whereby the longitudinal ribs simultaneously interengage with the entire bottom of the basket.

47. The method of checking out customers, as claimed in claim 43, comprising the additional step, after packaging, of separating the grocery cart from the unloading conveyor by a checker.

* * * * *